June 28, 1949.　　　　　F. TURRETTINI　　　　　2,474,602
LENGTH MEASURING MACHINE HAVING
LENS AND REFLECTOR MEANS
Filed Dec. 18, 1947　　　　　　　　　　　　　2 Sheets-Sheet 2
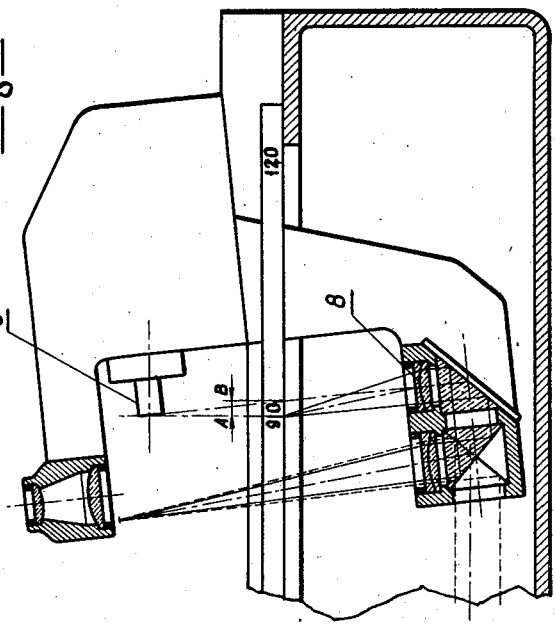
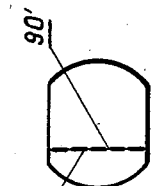
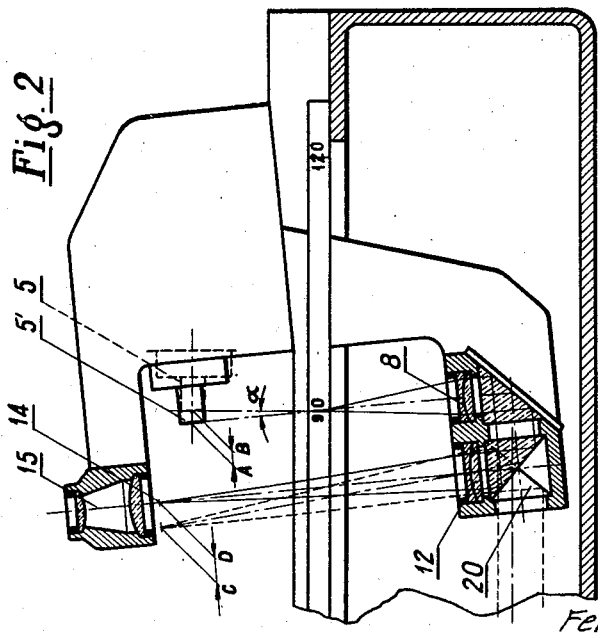
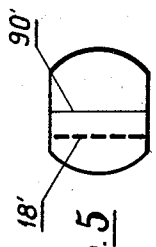
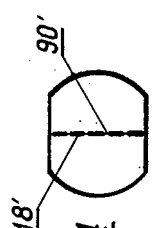
Inventor
Fernand Turrettini
By Robert E. Burns
Attorney Patented June 28, 1949

2,474,602

UNITED STATES PATENT OFFICE 2,474,602

LENGTH MEASURING MACHINE HAVING LENS AND REFLECTOR MEANS

Fernand Turrettini, Bellevue-Geneva, Switzerland, assignor to Société Genevoise d'Instruments de Physique, Geneva, Switzerland, a Swiss firm Application December 18, 1947, Serial No. 792,437
In Switzerland April 28, 1945

Section 1, Public Law 690, August 8, 1946
Patent expires April 28, 1965

1 Claim. (Cl. 88—1)

This invention relates to optical length measuring devices, and more particularly to such devices which are adapted for use in end gauge measuring machines; in these machines, there is a slide movable on a guideway, and two measuring anvils, one of which is secured at one guideway end, and the other on said slide. An optical device enables measuring accurately the distance separating said measuring anvils.

An object of this invention is to provide an optical device of the character described which is not influenced by the unavoidable deviations of the guideway, and this without making the machine too cumbersome, nor unhandy to attend to.

A main feature of the invention resides in that the movable slide carries two collimators, the first one focussed on a scale provided on the guideway and the second one focussed on an ocular secured on the slide. At said guideway end is provided a source of light, a reticle and a third collimator focussed on said reticle.

The second collimator shows in the ocular two simultaneous images, that of the scale, and that of the reticle, which serves as a guiding mark for the scale. In this way, the errors which would otherwise result from the deviations of the guideway are compensated by the corresponding movements of the collimators and thereby eliminated.

The attached drawing represents, by way of example, and diagrammatically a form of construction of an optical device embodying the invention, applied to a measuring machine.

Fig. 2 shows the error of measurement which would be introduced by a deviation of the guideway, if one should not eliminate it by bringing into coincidence the image of the reticle of the third collimator and that of a line of the scale in the second collimator, according to Fig. 3. The deviation of the guideway is strongly exaggerated for making the drawing clearer.

Figs. 4, 5 and 6 show the visual field in the ocular of the second collimator in different phases of operation.

Figure 1:
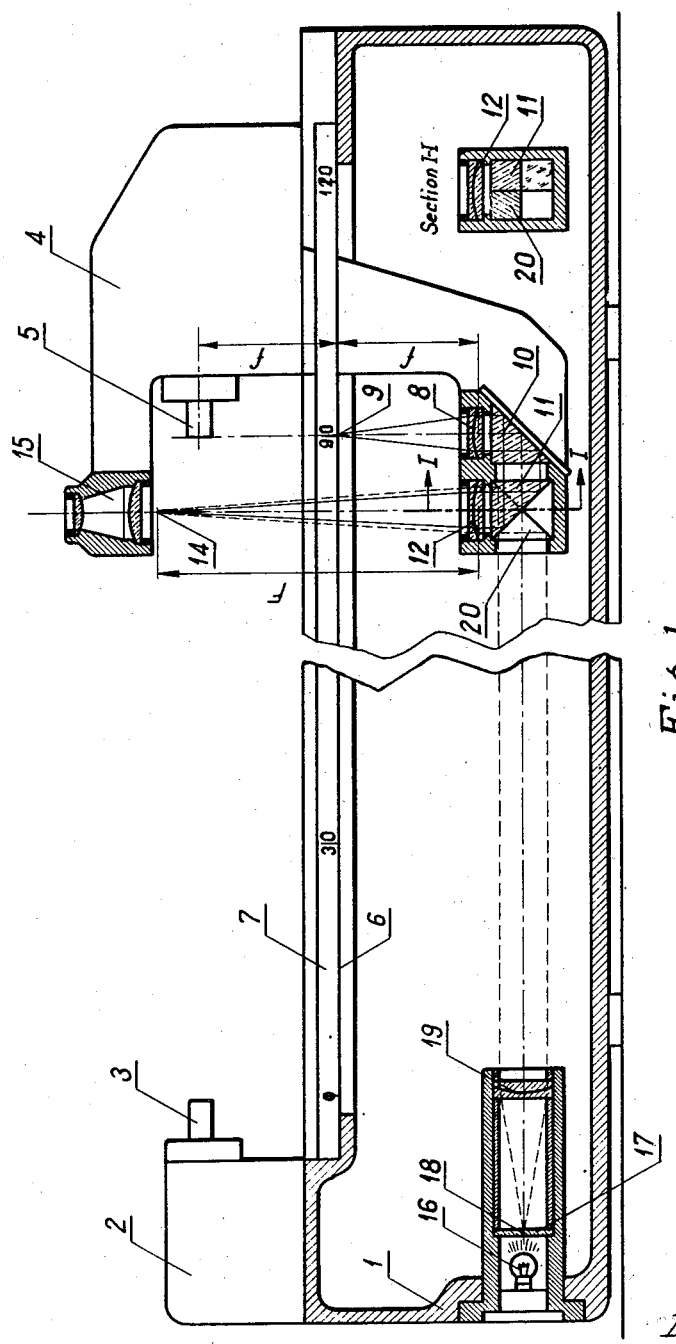
Fig. 1 represents an elevational view of said form of construction with the average travel of light rays as they would comport themselves if the guideway of the machine were mathematically rectilineal, a condition which is unrealisable.

In order to make the figures more intelligible, all of the light rays starting from a line of the scale and passing through the two first collimators are full lines, while those which start from the reticle of the third collimator and which penetrate into the second one are traced in dotted lines.

In Fig. 1, 1 is the guideway of the measuring machine carrying on its upper surface a fixed support 2 provided with the fixed measuring anvil 3. The guideway carries also a movable slide 4 provided with the movable measuring anvils 5. The two first collimators are secured on the slide 4. The objects to be measured are to be placed between the measuring anvils 3 and 5, by means of supports unshown and in such a manner to be in contact with the anvils.

For the simplicity of the diagram, the zero of the graduation made on the inner face 6 of the scale 7 secured on the frame 1, is figured vertically below the measuring face of the anvil 3, which is the part of the slide whose exact position must be determined.

The first collimator secured on the slide 4 is constituted by an objective 8 having its main focus at 9, on the graduation of the scale 7. A prism or mirror 10 sends back in the direction of the prism 11 the parallel light rays beam into which the objective 8 has transformed all of the rays diverging from the point 9. The prism 11 only covers half the objective 12 of the second collimator, which transforms the parallel beam into a beam convergent at 14, at the main focus of the objective 12. There is formed at this point a real image of one of the lines of the scale; this image is observed with the ocular 15.

Fig. 4 shows the field visible in the ocular 15, in which field the image of the line of the scale carrying for instance the order number 90 cm. is figurated by a continuous line 90′.

In Fig. 1, the frame contains yet a third collimator which is stationary. It is constituted by a source of light 16 in front of which is placed a reticle 17 presenting, for the clearness of the figures, a tracing in dotted lines 18 placed at the main focus of an objective 19. The rays emitted by a point of the reticle 17 are transformed by the objective 19 into a parallel beam which is sent back in the direction of the objective 12 of the second collimator by a prism 20 covering the other half of the objective 12. This parallel beam will be transformed into a beam converging at 14. There is formed at this point a real image of the dotted line tracing 18, an image which, in Fig. 4, is represented by a tracing in dotted lines 18′.

In other terms, if the machine is conveniently adjusted, and if its guideway presents no deviations, the image of a point lying on the axis of the first collimator and at its focus, will always superpose itself with the image of a point lying on the axis of the third collimator and at its focus. This superposition can be observed with the ocular 15. In this case, if the first collimator sights the line No. 90 cm. of the scale, there will be exactly 90 cm. between the measuring faces of the anvils 3 and 5.

In Fig. 2, on account of a deviation of the frame, the whole optical system carried by the slide 4 has taken an oblique position forming an angle $\alpha$ with its fundamental position. One may assume that this oblique position has been reached by a pivoting motion about the line No. 90 cm. This assumption is not necessary for the demonstration, because the pivoting motion can be effectuated about any point whatever.

This pivoting motion, in which the movable slide 4 and all that it carries is necessarily involved, has the effect that the measuring anvil 5 has come into 5'; it has moved to the left by a quantity $\overline{AB} = f \cdot tg\ \alpha$, $f$ being equal by definition to the main focal distance of the objective 8. The axis of this objective continues to pass through the line No. 90 cm., but the distance between the measuring anvils 3 and 5 is no longer 90 cm., it has been shortened by $f \cdot tg\ \alpha$. The image of the line No. 90 cm. has remained at 14, on the axis of the objective 12, but the image 18' of the dotted line tracing 18 has moved to the left in the field of the ocular 15, in relation with the new position of said axis, by a quantity $\overline{CD} = F \cdot tg\ \alpha$, value in which F is the main focal distance of the objective 12. This displacement of the image is due to the fact that the objective 12 and the prism 20 have both pivoted by an angle $\alpha$.

If, being thus aware of the fault of coincidence of the images 18' and 90', as per Fig. 5, one moves to the right the movable slide 4 until 90' comes to superpose itself on 18', as per Fig. 6, one shall reach the position shown in Fig. 3, in which the objective 8, which looks at the whole part of the scale in the vicinity of the line No. 90 cm., has its axis which cuts again the axis of measurements at the vertical of the line No. 90 cm., whose image coincides with the image of point 18, as per Fig. 1, and the distance between the anvils 3 and 5 will be 90 cm. again. This additional displacement will necessarily be equal to $f \cdot tg\ \alpha$ and it will thus have entirely compensated the error which would have been produced by the deviation of the frame if one had not resorted to the invention.

In other terms, the possible deviations of the frame have no influence on the precision of the measurements, provided one sets in the field of the second collimator the image of the lines of the scale in relation to the image of the reticle of the third collimator.

What I claim is:

An optical end measuring machine comprising in combination, a frame, a guideway on said frame, a movable slide on said guideway, a first length measuring anvil at one end of said frame, a second length measuring anvil on said slide facing said first anvil, an ocular on said slide, a graduated scale in said guideway, a collimating lens on said slide focussed on said scale, an objective having its focus in the image plane of the ocular, a reticle and a source of light at said frame end, a light collimator in said frame focussed on said reticle, a first mirror on said slide in spaced relation with said collimating lens, a second mirror on said slide in spaced relation with said objective and light collimator, said first and second mirrors being positioned to reflect the light from said collimating lens through said objective and thence to the image plane of said ocular, and a third mirror on said slide in spaced relation with said objective and collimating lens, said third mirror being positioned to reflect the light from said light collimator through said objective and thence to the image plane of said ocular, whereby said ocular enables simultaneous observation of an image of said scale and of an image of said reticle, the latter serving as a guiding mark for the former.

FERNAND TURRETTINI.

REFERENCES CITED

The following references are of record in the file of this patent:

UNITED STATES PATENTS

| Number | Name | Date |
|---|---|---|
| 1,524,089 | Eppenstein | Jan. 27, 1925 |
| 2,368,434 | Turrettini | Jan. 30, 1945 |

FOREIGN PATENTS

| Number | Country | Date |
|---|---|---|
| 1,727 | Great Britain | Feb. 3, 1915 |